United States Patent [19]

Rendall

[11] 4,353,877

[45] Oct. 12, 1982

[54] EXTRACTION PROCESS

[76] Inventor: John S. Rendall, Rosedene, Branksome Ave., Stanford-le-Hope, Essex, England

[21] Appl. No.: 963,777

[22] Filed: Nov. 27, 1978

[30] Foreign Application Priority Data

Mar. 13, 1978 [GB] United Kingdom ............... 9811/78

[51] Int. Cl.$^3$ ..................... C01G 43/00; C01B 25/01
[52] U.S. Cl. .......................................... 423/6; 423/7; 423/10; 423/319; 423/321 R
[58] Field of Search ................... 423/6, 7, 10, 321 R, 423/319

[56] References Cited

U.S. PATENT DOCUMENTS 3,649,209 3/1972 Coleby ............................. 422/264
4,035,292 7/1977 Himsley ............................. 423/6

FOREIGN PATENT DOCUMENTS 2352062 1/1977 France ............................. 423/10

Primary Examiner—Brooks H. Hunt
Attorney, Agent, or Firm—Bernard, Rothwell & Brown

[57] ABSTRACT

A process is described for extracting phosphoric acid and metal values, such as uranium, from phosphate rock using hydrochloric acid and independently extracting the phosphoric acid and metal values from a slurry of the acidulated rock.

12 Claims, 2 Drawing Figures

EXTRACTION PROCESS

BACKGROUND OF THE INVENTION

This invention relates to the extraction of desired constituents from minerals and is particularly concerned with the extraction of phosphoric acid and metal values from phosphate rock.

Phosphoric acid is conventionally prepared by a wet process involving the acidulation of phosphate rock with sulphuric acid followed by a liquid/solids separation on the resulting slurry. Appreciable proportions of the desired phosphoric acid and metal values especially uranium, are lost with the solids thus giving poor yields.

OBJECTS OF THE INVENTION

It is an object of the present invention to reduce the loss of phosphoric acid and metal values with the solids. It is a further object of the invention to improve the yield of desired constituents in a mineral extraction process.

In the present invention, extraction is performed on a slurry resulting from the treatment of a mineral with a liquid reagent before a liquid/solids separation takes place, so that at least a proportion of a desired constituent or constituents of the slurry which would otherwise be lost with the solids may be recovered. These and other objects of the invention will appear from the following description and claims.

SUMMARY OF THE INVENTION

According to this invention, I provide a process for the treatment of phosphate rock, comprising the steps of acidulating the rock with hydrochloric acid to convert the phosphate of the rock into phosphoric acid; selectively extracting the phosphoric acid with a suitable extractant and the metal values (e.g. uranium) with an ion exchange resin extractant from the acidulated chloride slurry in one or more contactors; removing the extractants substantially independently of the solids of the slurry; and separately recovering the phosphoric acid and the metal values.

The metal values can advantageously be extracted with suitable ion exchange resins.

I have found that hydrochloric acid is advantageously used in such a process to acidulate phosphate rock, in preference to the conventionally used sulphuric acid. Sulphuric acid gives complex products in the digestion process producing an acidulated slurry and the resulting extractant streams carrying the phosphoric acid and metal values require much clarification with the use of flocculating agents. Furthermore it is difficult to extract uranium from an acidulated sulphate-based slurry using ion exchange resins.

DESCRIPTION OF THE PREFERRED EMBODIMENTS

The phosphoric acid and metal values may be extracted in a single contactor using a liquid extractant for the phosphoric acid and an ion exchange resin in bead form to extract the uranium. The uranium should be in its higher valency state (i.e. $U^{6+}$) before being contacted with the ion exchange resin. For this purpose it may be necessary to employ an oxidant to ensure that the acidulated chloride slurry contains the uranium in $U^{6+}$ form.

Alternatively the phosphoric acid and metal values may be extracted in separate contactors arranged in series. The phosphoric acid is thus extracted with a suitable solvent, or with an ion exchange resin, in an upstream contactor from an acidulated chloride slurry in which the uranium is in the lower valency state (i.e. $U^{4+}$). It may be necessary for the acidulated chloride slurry to be reduced prior to introduction to the contactor to ensure that the uranium is present as $U^{4+}$. The slurry from which phosphoric acid has been extracted is then oxidized to convert the uranium to $U^{6+}$ and passed to a downstream contactor for extraction of uranium using an ion exchange resin in bead form, or, advantageously, in liquid form.

In either alternative form of the process described above, the hydrochloric acid may advantageously be recovered from the waste slurry from the contactor or contactors for recycle, so as to minimise cost.

The extractant containing phosphoric acid can be treated in any suitable way to recover and, if desired, purify the phosphoric acid. Advantageously the extractant containing phosphoric acid can be passed directly to a contactor for carrying out the purification process described in our co-pending application No. 14546/77.

The ion exchange resin in bead or liquid form can be treated to extract the uranium and regenerate the ion exchange resin for reuse.

The slurry and the extractant stream preferably pass through the contactor or contactors countercurrent and in substantially separate phases. The slurry may be repeatedly showered through the extractant stream during its passage through the slurry. Suitable contactors are of the type described in U.S. Pat. No. 3,649,209.

The invention will now be described by way of example with reference to a process for obtaining phosphoric acid from phosphate rock and extracting uranium contained in small proportions in the rock.

Figure 1:
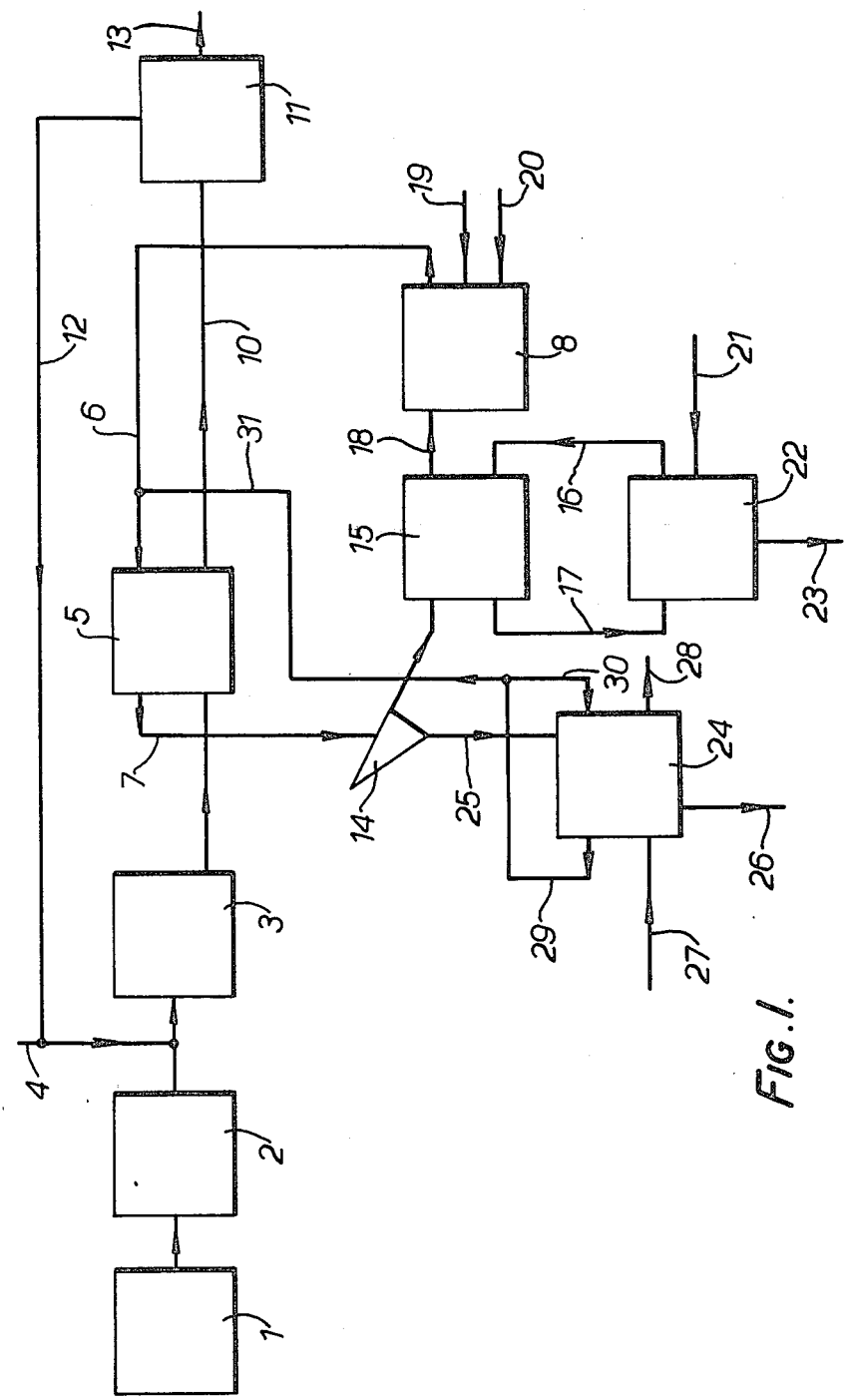
FIG. 1 is a flow diagram of a process in accordance with the invention in which phosphoric acid and uranium extraction are performed simultaneously.

Referring firstly to FIG. 1, phosphate rock from 1 is ball milled at 2 and the milled rock introduced to a digester 3 together with hydrochloric acid introduced via line 4 to form an acidulated chloride slurry. If the rock which has been ball milled contains uranium in the $U^{4+}$ form an oxidant, such as ferric chloride or sodium chlorate, is also introduced to the slurry to convert all the uranium to the $U^{6+}$ form. The acidulated chloride slurry then passes to contactor 5, which may suitably be of the type described in U.S. Pat. No. 3,649,209, through which the slurry continuously passes from left to right as shown in FIG. 1. A countercurrent extractant stream is introduced via line 6 from extractant preparation unit 8 from right to left and leaves the contactor on line 7.

The extractant stream introduced on line 6 contains two extractants—one for phosphoric acid and the other for the contained uranium values in the slurry. The phosphoric acid extractant may be any material known for the purpose, but is preferably methyl isobutyl ketone or a lower alcohol, such as i-butyl alcohol. The uranium extractant is preferably an ion-exchange resin in lightweight particulate form, capable of capturing the uranyl ions from the slurry from digester 3. Suitable resins are commercially available. The extractant stream as a whole is immiscible with the aqueous phase of the slurry and has a lower density than that phase, so that the extractant stream and the slurry tend to move through contactor 5 in separate phases.

As described in the above mentioned U.S. specification, the contactor has rotary buckets which, as the slurry passes through the contactor, repeatedly pick up the slurry and shower it through the extractant stream. On the downward movement of each bucket, extractant is taken down into the aqueous phase and released to float upwardly. Consequently, intimate contact between the two phases is achieved without undue agitation and the phosphoric acid becomes dissolved in its extractant, while the uranium values are captured by the ion exchange resin.

The solids of the slurry together with non-extracted aqueous constituents of that slurry are discharged via line 10 to separator 11 where the liquid component, consisting predominantly of aqueous hydrochloric acid, is recovered by any suitable method, such as the addition of tributyl phosphate in xylene. Recovered hydrochloric acid is recycled via line 12 to line 4 and waste solids such as calcium chloride, removed via line 13.

The extractant stream leaving the contactor 5 on line 7 is fed to a sieve-type separator 14, which separates the particulate ion exchange resin from the liquid extractant phosphoric acid complex.

The ion exchange resin from separator 14 is fed into a regenerator 15 which may be a second contactor preferably similar to contactor 5 and to which is fed in countercurrent a stream of eluant on line 16, which regenerates the ion exchange resin and is discharged on line 17 with the recovered uranium. The regenerated ion exchange resin is passed via line 18 to the extractant preparation unit 8, which is also fed with fresh ion exchange resin and liquid extractant via lines 19 and 20. After leaving the regenerator 15, the eluant stream on line 17 is processed for the recovery of uranium values in vessel 22, for example by precipitation, filtration and calcining, any suitable reagent or reagents being added via line 21 and the product containing the recovered uranium values being removed from line 23.

The liquid extractant phosphoric acid stream passes from separator 14 to a phosphoric acid stripping and purification unit 24 via line 15, which may suitably be a contactor of the type described in U.S. Pat. No. 3,649,209 modified as described in our co-pending Application No. 14546/77. The product, purified phosphoric acid, is withdrawn via line 26, water is introduced via line 27 and waste effluent is withdrawn via line 28. Recovered liquid extractant is withdrawn via line 29: some is recycled via line 30 to the unit 24, while some is recycled to the liquid extractant stream in line 6 via line 31.

Because of the efficiency of the contactor 5, substantially all the phosphoric acid of the slurry, including that carried in contact with the solids, is extracted by the liquid extractant, and the tailings discharged on line 13 contains no significant amount of phosphoric acid. If, however, a liquid/solids separation of the slurry from digester 3 had taken place and only the liquid fed into contactor 5, a substantial proportion of the phosphoric acid would have been lost from the process with the solids; a similar proportion of the contained uranium values would have been lost at the same time. The process as described has an enhanced yield and, because extraction of the phosphoric acid and the metal values is effected simultaneously, only a single contactor is required.

Figure 2:
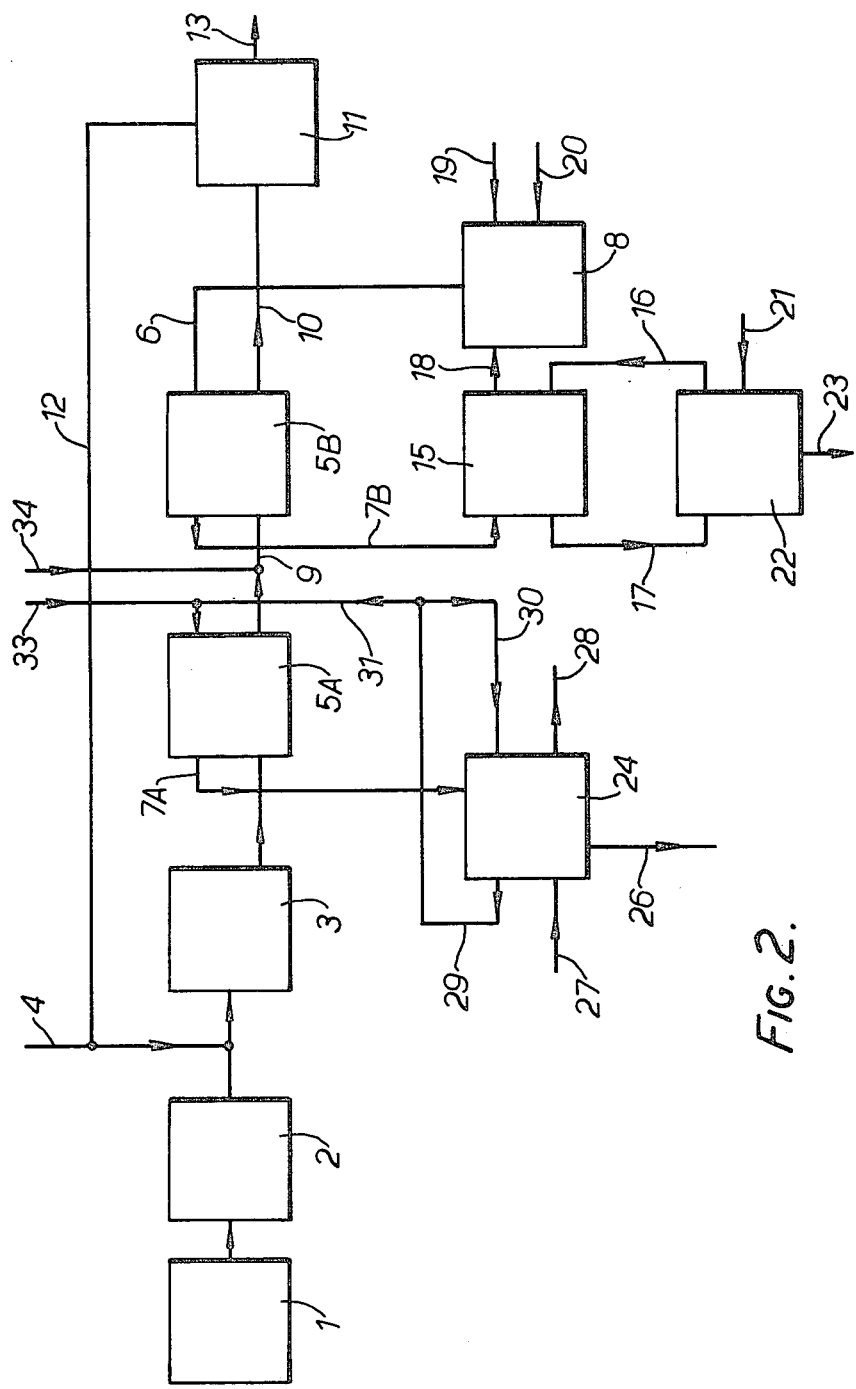
FIG. 2 is a flow diagram of a process in accordance with the invention in which phosphoric acid and uranium extraction are performed sequentially.

However, the two extractions may be performed sequentially as illustrated in FIG. 2, where components similar to those of FIG. 1 are given similar reference numerals.

In FIG. 2, two contactors 5A and 5B take the place of contactor 5 of FIG. 1, being similar in construction to the latter. However the slurry in digester 3 is monitored by electrode potential measurements and controlled to ensure that the uranium is in the $U^{4+}$ form. If necessary a suitable reducing agent such as iron or sulphur dioxide is added. Contactor 5A is fed with liquid extractant for the phosphoric acid on line 33, combined with some extractant returned via line 31 from stripping and purification unit 24. The phosphoric acid liquid extractant stream is passed via line 7A to unit 24 where purified phosphoric acid is obtained as before.

The slurry, from which phosphoric acid has been withdrawn, but which still contains the metal values, is passed to contactor 53 via line 9. During its passage through line 9 electrode potential monitoring is carried out and the $U^{4+}$ converted to $U^{6+}$ by addition of a suitable oxidant such as ferric chloride or sodium chlorate, so that $U^{6+}$ can be extracted using an ion exchange resin in contactor 7B. The ion exchange resin can conveniently be in liquid form, which removes the need for subsequent separation using a separator 14 such as shown in FIG. 1. The extractant containing the metal values is withdrawn via line 13 to regenerator 15. Of course, if bead form resin is used in contactor 7B, a separator can be interposed in line 7B.

The separation and purification of the phosphoric acid and uranium products may be carried out as previously described, as is the recovery of hydrochloric acid for reuse.

While the above description has been limited to the treatment of phosphate rock, the process can be applied to other minerals of which two or more desired constituents are to be separately removed. The selective extractants employed are those appropriate to the desired constituents.

I claim:

1. A process for the extraction of phosphoric acid and metal values from phosphate rock comprising:
   acidulating the phosphate rock with hydrochloric acid to convert the phosphate of the rock into phosphoric acid,
   contacting a slurry of the acidulated rock with selective extractants for phosphoric acid and metal values contained in the slurry;
   removing the extractants substantially independently of the solids of the slurry; and
   separately recovering the phosphoric acid and metal values.

2. A process according to claim 1, wherein said phosphoric acid and metal values are extracted simultaneously.

3. A process according to claim 1, wherein said phosphoric acid and metal values are extracted in stepwise fashion.

4. A process according to claim 1, wherein the phosphoric acid and metal values are extracted from the slurry by passing the slurry and selective extractants for said phosphoric acid and metal values in countercurrent in substantially separate phases while causing the slurry to be repeatedly showered through the extractant stream.

5. A process according to claim 1, wherein the extractants are mutually immiscible liquids which are also immiscible with the aqueous phase in the contactor.

6. A process according to claim 1, wherein the extractant for the metal values is an ion exchange resin.

7. A process according to claim 6, wherein the extractant for the metal values is a light weight particulate ion-exchange resin.

8. A process according to claim 1, wherein the phosphoric acid is extracted with methyl isobutyl ketone or a lower alcohol.

9. A process according to claim 1, wherein the phosphoric acid and metal values are extracted in separate contacting steps and the metal values are extracted using an ion exchange resin in liquid form.

10. A process for the extraction of phosphoric acid and uranium values from phosphate rock comprising:

acidulating the phosphate rock with hydrochloric acid to convert the phosphate of the rock into phosphoric acid;

contacting a slurry of the acidulated rock with methyl isobutyl ketone or isobutyl alcohol as extractant for phosphoric acid and a lightweight particulate ion exchange resin capable of capturing uranyl ions by passing the slurry and extractants in countercurrent in substantially separate phases, while causing the slurry to be repeatedly showered through the extractant stream;

removing the extractants substantially independently of the solids of the slurry; and recovering the phosphoric acid and uranium values.

11. Phosphoric acid and metal values when extracted from phosphate rock by the process of claim 1.

12. Phosphoric acid and uranium values when extracted from phosphate rock by the process of claim 10.

* * * * *